US00RE38783E

(19) United States
(12) Reissued Patent
Harris

(10) Patent Number: US RE38,783 E
(45) Date of Reissued Patent: Aug. 30, 2005

(54) REFERENCE MARKINGS ON CONSTRUCTION MATERIALS

(76) Inventor: David Neal Harris, P.O. Box 4330, Sonora, CA (US) 95370

(21) Appl. No.: 09/953,314

(22) Filed: Sep. 14, 2001

Related U.S. Patent Documents

Reissue of:
(64) Patent No.: 5,950,319
Issued: Sep. 14, 1999
Appl. No.: 08/848,686
Filed: Apr. 29, 1997

(51) Int. Cl.[7] ..... G01B 3/00; E04B 1/00
(52) U.S. Cl. ..... 33/494; 33/1 B; 52/105
(58) Field of Search ..... 33/1 B, 1 G, 27.03, 33/494, 526, 527, 528, 563, 565, 566, 733; 52/105

(56) References Cited

U.S. PATENT DOCUMENTS

| | | | | | |
|---|---|---|---|---|---|
| 4,271,596 | A | * | 6/1981 | Ganis | 33/1 B |
| 4,708,755 | A | * | 11/1987 | Lambelet | 52/105 |
| 4,827,621 | A | * | 5/1989 | Borsuk | 33/1 B |
| 4,858,402 | A | * | 8/1989 | Putz | 52/105 |
| 4,870,788 | A | * | 10/1989 | Hassan | 52/105 |
| 4,924,644 | A | * | 5/1990 | Lewis | 52/105 |
| 4,927,696 | A | * | 5/1990 | Berg | 52/105 |
| 5,033,197 | A | * | 7/1991 | Irvello | 33/27.03 |
| 5,195,249 | A | * | 3/1993 | Jackson | 33/528 |
| 5,673,489 | A | * | 10/1997 | Robell | 33/1 B |
| 5,950,319 | A | * | 9/1999 | Harris | 33/494 |

FOREIGN PATENT DOCUMENTS

| | | | | |
|---|---|---|---|---|
| DE | 2841273 | * | 4/1980 | 33/1 B |
| FR | 520561 | * | 6/1921 | 33/1 B |
| FR | 945 860 | | 5/1949 | |
| GB | 1578521 | * | 11/1980 | 33/1 B |

* cited by examiner

*Primary Examiner*—G. Bradley Bennett
(74) *Attorney, Agent, or Firm*—Henneman & Saunders; Larry E. Henneman, Jr.

(57) ABSTRACT

Construction materials such as 4-foot by 8-foot sheets of plywood, drywall, and similar materials have fiducial markings for quick visual reference of the user. Imprinted lines of equal spacings indicate to the user the location of wall studs at 16-inch or 24-inch spacings, and the sheet of material can also include oblique lines and one or more circles, for reference of the user in quickly determining the size of remnants. Similar markings may also be applied to roll-stored materials such as carpeting.

20 Claims, 4 Drawing Sheets

FIG.1 PRIOR ART
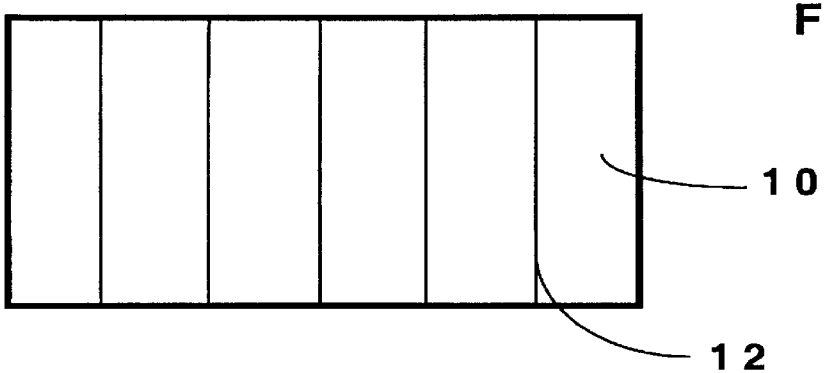
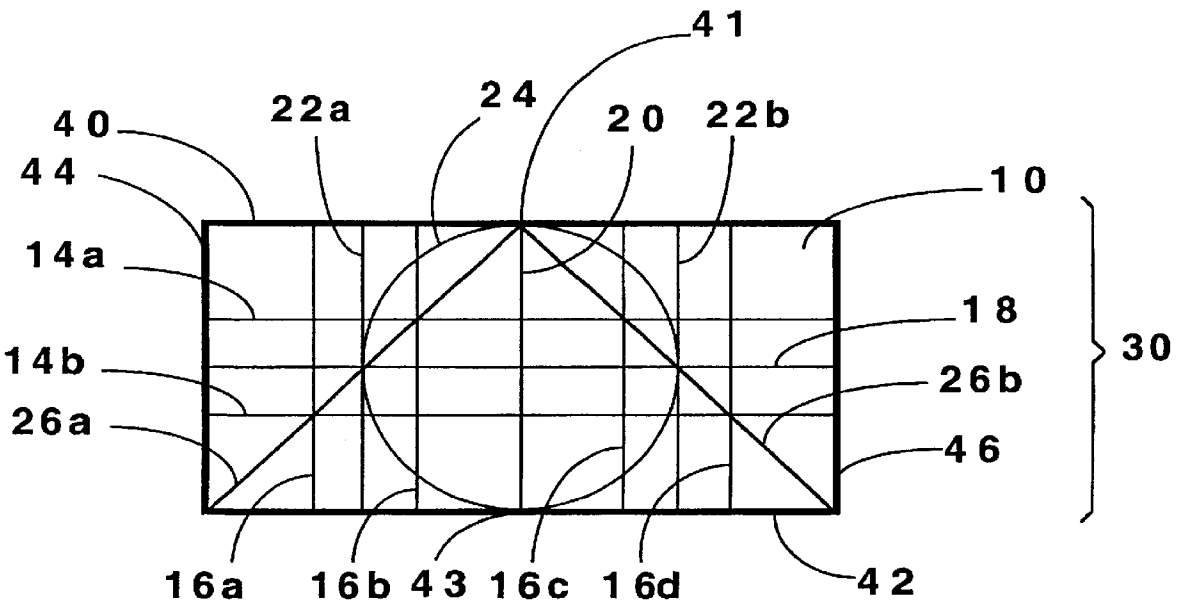
FIG. 2a

REFERENCE MARKINGS ON CONSTRUCTION MATERIALS

Matter enclosed in heavy brackets [ ] appears in the original patent but forms no part of this reissue specification; matter printed in italics indicates the additions made by reissue.

BACKGROUND OF THE INVENTION

The invention relates to the building and construction industry. Specifically, it relates to a new symbolic visual metric marking method applied to construction materials for the purpose of allowing installers to:

1. Visually determine accurate orientation and alignment of construction materials to their underlying support structure and attachments, without repeated measurement, during installation.
2. Visually determine size (and therefore suitability) of construction material remnants, without repeated measurement, when selecting a material remnant item for installation.
3. Aid in the act of attaching construction materials to the underlying support structure by providing a visual reference to guide installers during the installation of material fastening devices.

This invention further aids building inspectors in their determination of an installation site's compliance with building codes and standards regarding spacing and fastening.

Products used in the construction and maintenance of buildings such as plywood, paneling, drywall board, building paper, roofing products, and carpeting, are provided by the manufacturers in accordance with size and shape standards convenient to both the materials manufacturers and construction industries utilizing those materials.

Architects, designers, contractors and installers of those materials at the job site rely on the standardized shapes and utilize them in concert with their skills, experience and relevant construction standards, blueprints and building codes to create safe and reliable buildings. To achieve quality construction at economical cost, the construction industry must make optimum use of both labor and materials. This translates directly into minimizing wasted time and materials at the job site while meeting the standardized construction practice requirements specified in building codes.

Frequently during construction full-size units of material require accurate trimming for installation in a given position. This process generates remnant items of material which require additional measuring and cutting prior to use. Efficient use of these remnants challenges contractors, supervisors and installers with the problem of accurately determining and cataloging accurate knowledge of the remnant's dimensions so that the remnant product may efficiently used in an appropriate position. At large construction sites this can be a formidable task.

Regardless of the type of product, the common and accepted practice in today's construction industry requires a workman to translate actual measurements of the intended installation location and materials at hand. There are always sufficient slight deviations in installation technique and site variance that make impossible reliance on blueprints or drawings for accurately trimming materials. Thus, at the construction site installers are continually measuring both the materials and target installation sites for the purpose of achieving proper fit and utilization of material.

Prior to the material's being fastened to its supporting structure another time consuming step or process must be followed. The piece must be aligned, measured and marked to display the location of the underlying support member to allow the installer to properly and securely attach the piece in accordance with building codes.

Today's construction practice employs automatic fastener systems such as magazine fed nail guns to quickly attach construction materials to their underlying support. Should the alignment of the fastener gun to the underlying and thus invisible support member be incorrectly accomplished, these powerful fastening systems can severely damage the surface material, requiring removal and replacement of the material, a waste of both labor and material; in the most severe instance, power driven fasteners have caused serious injury to other construction personnel working opposite the installation site. Thus it is poor practice to attempt to install even full-size sheets of material without measuring and marking the location of underlying support structure.

This repetitive and tedious measurement and marking of both full-size material items as well as remnants significantly slows installation of product, requiring additional time and expense. Additionally, if the material is not correctly marked at the job site, it may take extra fasteners to attach it to the final framework in conformance with building codes. Inspectors noting improperly spaced or attached fasteners require rework or other remedial action that further delays the job. Lastly, a further inadequacy of present on-site measurement procedures is that the constant use of tape measures, straight edges, snap lines, chalk, carpenter pencils and pens creates an additional supply and maintenance logistical problem for the builder. All these items wear out and need constant maintaining and replacing. It is time consuming to search for misplaced measuring tools, refill chalk line snap boxes with chalk and sharpen or replace worn out pens and pencils. In addition, the use of some tools such as snap line chalk can leave undesirable residue upon construction materials or foul subsequent finishing processes.

SUMMARY OF THE INVENTION

In addition to alleviating the previously described wasteful practice presently employed in the construction trades to size and install materials at the job site, several objects and advantages of the present invention are:

1. To aid the installer of both full-size and remnant pieces of construction material by providing natural and intuitive visual clues upon those materials, that aid in determining the proper position and alignment of materials to be installed relative to those pieces of material previously installed.
2. To aid the installer of both full-size and remnant pieces of construction material by providing natural and intuitive visual clues upon those materials, that aid in determining position and alignment required in deploying the proper quantity and spacing of material fasteners during installation.
3. To aid the installer in accurately and safely deploying material fastening devices when attaching construction materials by providing natural and intuitive visual clues upon those materials that aid in alignment of the material with its underlying support structure.
4. To reduce the effort required to identify candidate remnant material portions by size with respect to the measured dimensions of the required installation location.

Further objects and advantages are to provide building inspectors and construction supervisors visual fiducial marks on the surface of installed materials to aid in the determination of compliance with appropriate building codes and standards with respect to placement and quantity of fasteners. This practice will advance workplace safety as well as increase job site productivity.

DRAWING FIGURES

FIG. 1 shows a 4 foot by 8 foot rectangular piece of typical sheet-type construction material bearing prior art guide-line markings exemplary of those measured and marked at the job site by installers or occasionally applied by manufacturers.

FIG. 2a shows a 4 foot by 8 foot rectangular typical piece of sheet-type construction material bearing symbolic visual marking of the type embodied by this invention.

FIG. 5 shows roll-type construction material such as carpeting or tarpaper, bearing fiducial markings according to the invention.

DESCRIPTION OF PREFERRED EMBODIMENTS

Figure 2B:
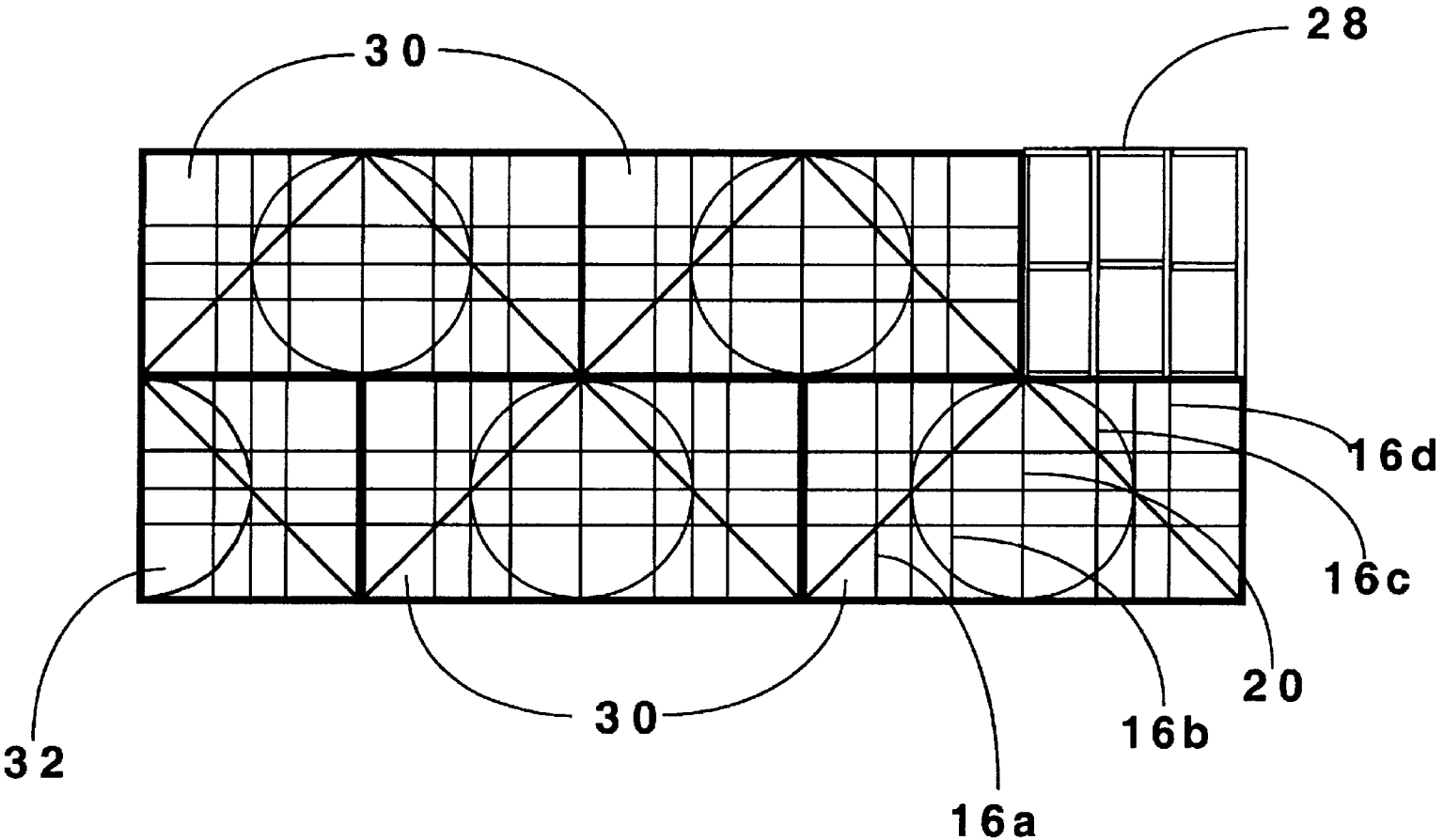
FIG. 2b shows several sheets of material bearing symbolic visual markings arranged upon a construction surface support framework.

A typical embodiment of prior art is illustrated in FIG. 1. The rectangular sheet substrate of construction material 10 is typically measured by hand and marked with guidelines 12 by personnel at the job site. Occasionally material manufacturers will apply similar appearing guidelines to sheets of construction material at the time of manufacture. For eight-foot material these markings 12 would ordinarily be at 16-inch spacings, according to U.S. construction practices.

A typical embodiment of the present invention is illustrated in FIG. 2a. The rectangular sheet substrate of construction material 10 is here depicted with numerous fiducial lines applied to the surface of the material. These lines consist of:

A short dimension center fiducial line 20.

A long dimension center fiducial line 18.

Four short dimension ⅓ sheet fiducial lines 16a to 16d.

Two long dimension ⅓ sheet fiducial lines 14a and 14b.

Two diagonal fiducial lines 26a and 26b.

One circular fiducial marking 24 oriented at the intersection of the long axis center 18 and short axis center fiducial lines 20.

Together, these fiducial lines comprise markings according to the invention for a 2 to 1 length to width ratio sheet of construction material 30.

The perimeters of the sheets or remnants shown herein are identified by an outline fiducial line 40 for clarity, to show the edges of the sheets. However, this feature is not considered to be a required part of this symbology. The above described required fiducial marks applied to a sheet of construction material comprise the preferred embodiment of the invention.

FIB. 2b illustrates numerous full sheets of construction material 30 bearing reference markings and one remnant (partial) sheet 32 of material bearing markings. These sheets are shown correctly oriented with respect to installation practice and applied to construction support framework 28.

Figure 3B:
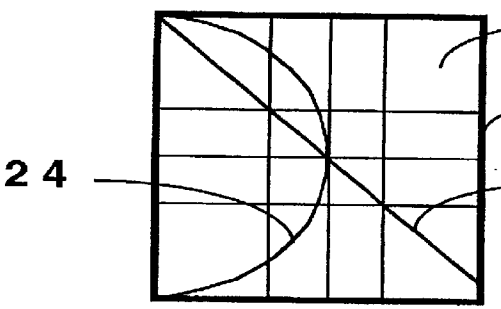
FIGS. 3a to 3e show various fractional-sheet remnants of a typical sheet-type construction material bearing symbolic visual markings of the type embodied by this invention.
Figure 3A:
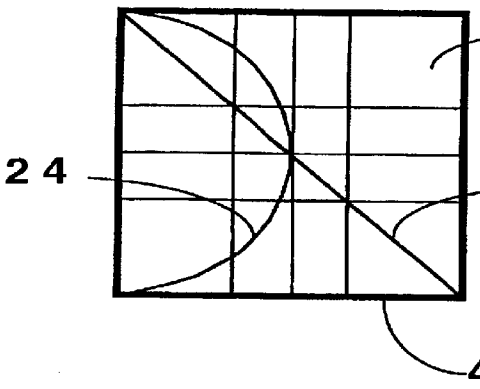
Figure 3D:
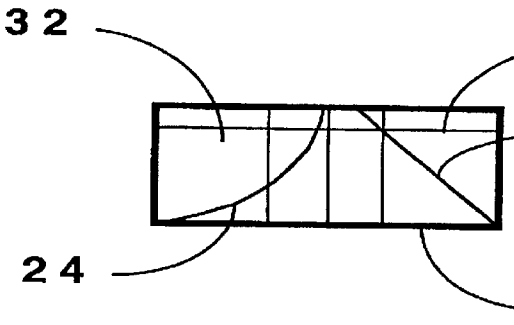
Figure 3C:
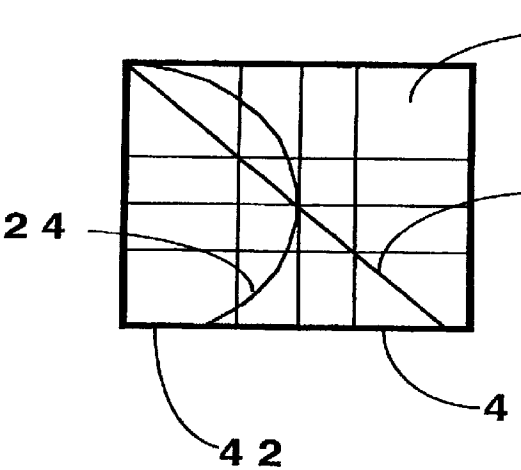
Figure 3E:
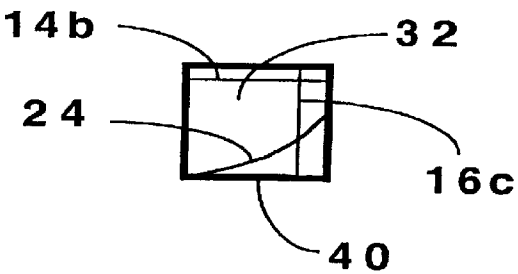

FIGS. 3a–3e illustrate five examples of partial sheet construction material remnants each bearing portions of markings as in the invention. FIG. 3a depicts an exact ½ sheet remnant of construction material 32. FIG. 3b depicts a slightly less than ½ sheet remnant of construction material 32 which has been trimmed short on its right-hand perimeter edge 40. FIG. 3c depicts a slightly less than half sheet remnant which has been trimmed short on its bottom perimeter edge 40. FIG. 3d and FIG. 3e each show a small fractional sheet remnant which has been trimmed short on more than one of its perimeter edges 40.

Figure 4:
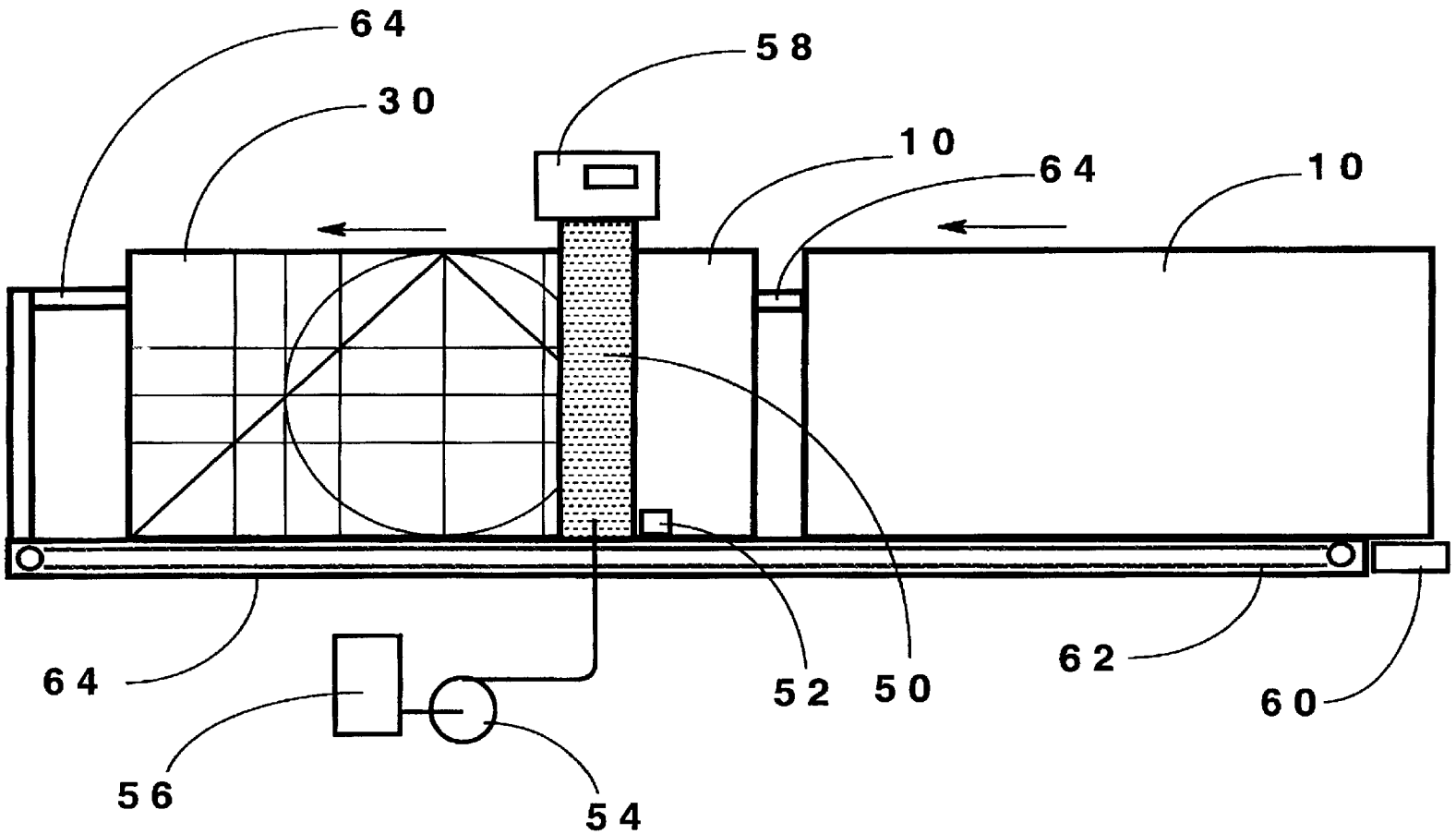
FIG. 4 shows an apparatus to apply symbolic visual markings to sheet-type construction materials.

FIG. 4 illustrates an apparatus for applying visual marking symbology to sheet-type construction materials. This apparatus consists of a framework 64 which supports and encompasses a material conveyor belt 62, a conveyor belt drive motor system 60, and a large stationary multiple-nozzle ink jet print head 50 that is controlled by the print head controller 58. The large stationary multiple-nozzle ink jet print head 50 is supplied ink under pressure from an ink reservoir 56 via the ink pump 54. A material position sensor 52 detects the position of approaching virgin substrate material sheets 10. FIG. 4 illustrates the substrate material moving from right to left with the symbolic visual markings being applied by the stationary ink jet print head 50 as the material passes through.

FIG. 5 illustrates visual marking symbology applied to roll-type construction materials. Materials such as carpet, linoleum and construction films are suitable for this type of application. The most appropriate method to apply this type of marking is during manufacture of the material. Here the basic four-foot by eight-foot symbol as in FIG. 2a is applied to the rear surface of an eight-foot wide roll-type construction material 36 in a continuous manner. The visual marking symbol is repeated twice across the width 34a, 34b and repeats continuously down the length of the roll 34c, 34d. This embodiment of the basic invention offers similar cutting, installation and remnant sorting advantages to installers of roll-type material as previously described for sheet-type materials.

Operation

FIG. 2a shows a typical representation of a standard building product such as plywood, drywall, or sheet metal, measuring 48 inches×96 inches (4 feet×8 feet). Horizontal lines 14a, 18, and 14b are placed at 16, 24, and 32 inches spacing from edge 40 to edge 42. Lines 14a and 14b represent the standard 16 inch building layout, when measuring from either perimeter edge 40 or 42. Line 18 denotes the increasingly used 24 inch framing layout. Lines 16a, 16b, 16c, 16d and 20 denote the 16 inch layout format measured from perimeter edge 44 to edge 46. Lines 22a, 22b and 20 represent the 24 inch layout format from either perimeter edge 44 or 46. Diagonal lines 26a and 26b bisect each half of the sheet of material in FIG. 2a.

The radius center point of the reference circle 24 is placed at the intersection of the center lines 18 and 20. By doing so a fiducial symbol is created that allows numerous important dimensions and points to be recognized without actually measuring the piece. Circles of other sizes can be used, such as two-foot circles arranged with aligned centers and repeating contiguously across the long dimension of the sheet material. What is important is that the selected arrangement be capable of quickly indicating to the user a dimension or proportion of the sheet material or the size of a remnant.

The size and location of the circle 24 allows a workman to quickly recognize that the circle is 48 inches in diameter. Thus, the visual appearance where it touches the perimeter of the sheet at points 41 and 42 can be a sensitive visual indicator that reveals if a sheet is less than full-size. Additionally, the reference circle 24, in conjunction with diagonals 26a and 26b, identifies the center of each half-sheet at the points where lines 22a, 22b and line 18 intersect. These are key reference points in the quick and efficient utilization of remnant pieces of sheet construction material.

Referring now to FIGS. 3a, 3b and 3c as well as FIG. 2a, diagonal lines 26a and 26b further help identify that a sheet or half-sheet remnant is square. The symbolic visual markings will accurately reveal the removal of even a small amount of material from either a full sheet of a half-sheet remnant. FIG. 3a shows an exact half-sheet remnant. Note that the circle 24 and the diagonal 26a each extend from corner to respective corner and visual symmetry exists within the piece.

Although the depicted line marking configuration is preferred, it should be understood that other oblique lines could be used, so long as these occur in a regular pattern with the oblique lines extending between edges of the sheet, preferably with an integral number of repeats of the oblique lines defining the length and/or width of a full sheet of material.

FIG. 3b reveals that the right hand perimeter edge has been slightly trimmed. The visual indicator is that the diagonal 26a no longer intersects the lower corner of the right-hand perimeter, as shown on FIG. 3a.

FIG. 3c is a similar representation of a less than half-sheet remnant that has been slightly trimmed at its lower perimeter edge 42. Note that in this example there are two visual indicators. First is the circle 24, revealing that it no longer intersects the left-hand corner of the lower perimeter edge, and second, the diagonal 26a which no longer intersects the right-hand corner of the lower perimeter edge.

Referring now to FIGS. 3d and 3e, these figures depict a fractional remnant of sheet-type construction material bearing markings as embodied in this invention. Note that in both figures the remaining fragments of markings visually indicate that the dimensions of each piece exceed the minimum frame span distance of 16 inches, making the piece a suitable scrap for retention as fill material. Line 14b on FIG. 3d (in combination with circle fragment 24 or diagonal 26a) and lines 14b and 16c (along with circle fragment 24) on FIG. 3e are the visual indicators conveying this information.

Thus the markings of the invention are shown to differentiate material remnant pieces which no longer possess the minimum span dimension of 16 inches from those pieces which do exceed the minimum span distance of 16 inches. Sheet material remnants of insufficient minimum span size can thus be easily sorted from acceptable fill candidate remnants without measuring.

In the process of building with sheet construction material, a worker starts with a supply of full sheets of material, as indicated in FIG. 2b. With such material as plywood or drywall a worker starts by applying all the full sheets which will quickly and conveniently fit upon the structural support 28, then drops back to do the pickup work (pickup work is the infilling of the missing partial sheet pieces). For example, in building a house, plywood is applied to the exterior surface of the supporting frame work 28 to give the frame work structural strength and stability. FIG. 2b generally shows how the sheets are applied horizontally, with each succeeding row staggered to the prior one. This practice is commonly known in the art as "shearing" a building or "shearplying". FIG. 2b can simultaneously represent the progress of application of sheet drywall as is commonly applied to interior surfaces.

In both instances a worker begins by applying full sheets of material. The full sheets of material 30 are positioned as shown in FIG. 2b and tacked or fastened with a few nails or screws to temporarily secure the piece to the frame work. Then a worker with a speed fastener or nail gun permanently nails it off with the required number of fasteners. As can be seen in FIG. 2b, the vertical guidelines 16a, 16b, 16c, 16d and 20 provide a ready guide for 16 inch-on-center fastening. Building code required nailing format is usually one fastener at each edge and five fasteners equally spaced across the span of 48 inches, sometimes denser in earthquake-susceptible regions. The horizontal lines 14a, 14b and 18 assist in determination of proper fastener installation by providing visual reference points of spacing.

Proper fastener sites are located at the intersection of the appropriate vertical guidelines, either 16a, 16b, 16c, 16d or 20 and each of the horizontal guidelines 14a, 14b or 18. To complete the series of five fasteners across the span, the remaining two fasteners can be located on the appropriate vertical guideline 16a, 16b, 16c, 16d and 20 at a visually determined mid position between the upper perimeter edges 40 and horizontal guideline 14a; and similarly, the visually determined mid position between the lower perimeter edges 42 and horizontal guideline 14b.

Even if the frame work support members are slightly mis-aligned with the sheet of material bearing the markings of the invention, the initial temporary tack nails can reveal this misalignment as a slight offset in tack nail position relative to the marking guidelines. The worker, noting and maintaining this small displacement, can still use the lines as a guide. This greatly speeds up the fastening or nailing process. When one considers the time spent guessing the location of the frame work and attempting to nail equal distance for a quality and code required job, it should be clear that the markings of the invention can significantly reduce the difficulties of keeping fasteners centered on their respective support frame work members and reduce danger associated with firing power nail guns through the material. The markings can reduce hesitation or periodic stopping to acquire visual clues of support frame centerline position.

Again referring to FIG. 2b, after applying all the full sheets 30 in the given work area, the worker begins filling in the smaller areas which require cutting of full sheets or the use of remnants. When filling in pieces of plywood an experienced worker will use the smallest available piece that will span the opening. Use of material bearing the markings will save valuable time by virtually eliminating the need for the workman to measure individual remnants of material and further eliminate the need to use a snap line to establish a line for cutting. With material bearing such markings the workman always has available fiducial lines to assist in sizing and cutting the material. This marking symbol allows the workman to size and cut the remnant without measuring the entire piece.

As is current practice in the art for present material not bearing symbolic visual markings, the worker must measure to determine whether the sheet remnant is large enough to span the opening, place the sheet remnant on saw horses, again measure the sheet remnant and mark it for the cut. Next the workman must use a straight edge and/or a snap line to mark the path of the intended cut and finally, cut the piece. This tedious activity applies similarly to the art of laying particle wood underlayment, plywood floors, roof plying and interior drywall.

Further, it is within the scope of this invention to use repeating symbolic markings on the reverse side of roll-supplied construction material such as carpet and linoleum as well as the more conventional types of sheet-supplied material such as plywood, drywall, veneer and paneling. The markings can also be used on material such as tarpaper or "felt". Fiducial markings on rolled material are indicated schematically in FIG. 5. The markings of FIG. 2a may be used in each of the rectangular areas 34a–34d in FIG. 5, for wall-applied materials, but other fiducial lines may be used for carpeting or other material applied on a floor or other surface not having stud wall intervals.

This invention embodies a simple, graphical symbology applied to the surface of construction materials to visually reduce or eliminate tedious and error-prone repetitive measurement of the material and remnants prior to and during installation at the job site. This symbolic visual marking means applied to the surface of construction materials acts as guide and fiducial markings designed to aid the installer, supervisor and inspector in the cutting, shaping, trimming and installing of construction material as well as aiding the inspection of installed construction material.

It can be seen that material bearing symbolic visual markings as herein described offers substantial advantages over unmarked materials with respect to ease and cost of installation and reduction of waste. Furthermore, the symbolic visual markings can either be applied at the job site, or applied during the manufacturing of the material using equipment similar to that disclosed herein. Construction materials bearing symbolic visual markings as described herein present advantages over unmarked construction materials in that Materials bearing symbolic visual markings easily reveal their physical dimensional continuity without being physically measured.

Material remnants bearing symbolic visual markings can be easily identified, cataloged and sorted as to suitability for use without being physically measured.

Workmen installing materials bearing symbolic visual markings will reduce wasted and repetitive effort when installing both remnant pieces and full sheets because the fiducial guidelines aid in proper installation of fastening materials.

Symbolic visual markings also aid in the cutting and preparation of sheets of material because the fiducial guidelines allow accurate measurement to be made over a full span by providing a simple system of reference points upon the surface of the material.

Although the above descriptions and drawings disclose many specifics, these should not be construed as limiting the scope of the invention but as merely providing illustrations of the presently preferred embodiments of this invention. The markings of the invention used to aid in the preparation, sizing and installation of a wide assortment of both sheet and roll supplied materials such as carpet padding, sheet foam insulation, industrial gasketing, sheet and roll moisture barrier and even finish materials such as wallpaper. Thus, the scope of the invention should be determine by the scope of the appended claims and their legal equivalents rather than by the examples given.

I claim:

1. A sheet of manufactured construction material having as manufactured fiducial markings for visual reference of a worker installing the sheet of material in whole or in part, comprising:

a rectangular substrate sheet of material of preselected size having a width and a length and having a plurality of edges, a plurality of first fiducial lines parallel to one another, equally spaced and parallel to one edge of the substrate sheet of material, a plurality of second fiducial lines, parallel to one another and equally spaced and perpendicular to said one edge, and at least one oblique fiducial line on the substrate sheet of material, crossing at least some of the first and second fiducial lines and oriented at an oblique angle relative to said one edge, said oblique line extending from a corner of the sheet of material across the width of the sheet of material to an opposite edge and crossing over no other oblique line.

2. A sheet of construction material as in claim 1, further including at least one circle imprinted on the sheet of material and intersecting some of the fiducial lines.

3. A sheet of construction material as in claim 1, wherein the substrate sheet of material has a length which is twice its width, and wherein two said oblique fiducial lines are included, the two oblique lines being at right angles to one another and at 45° to said one edge of the substrate sheet of material, each oblique fiducial line extending from a corner of the sheet of material, where two perpendicular edges intersect, to a center point on said one edge of the sheet of material.

4. A sheet of construction material as in claim 3, further including a circle imprinted on the substrate sheet of material, the circle having a diameter equal to the width of the substrate sheet of material, such that the circle falls tangentially on said one edge and on an opposite, parallel edge of the sheet of material.

5. A sheet of construction material as in claim 1, wherein the substrate sheet of material has a length twice its width.

6. A sheet of construction material as in claim 5, wherein the substrate sheet of material has a width of four feet and a length of eight feet, and wherein said first fiducial lines, parallel to said one edge, extend lengthwise and are at 16 inch spacings from said one edge to an opposite and parallel edge.

7. A sheet of construction material as in claim 6, wherein the second fiducial lines extend widthwise through the sheet of material and are at 16 inch spacings.

8. A sheet of construction material as in claim 6, further including fiducial lines extending lengthwise at two foot spacings.

9. A sheet of construction material as in claim 6, further including fiducial lines extending widthwise in the sheet of material at two foot spacings.

10. A roll of manufactured material having as manufactured fiducial markings for visual reference of a worker installing the material from the roll against a surface, comprising:

a substrate sheet of material of preselected width and having a length, a leading edge and two parallel side edges, a plurality of first fiducial lines parallel to one another, equally spaced and parallel to the side edges of the substrate sheet of material, a plurality of second fiducial lines, parallel to one another and equally spaced and perpendicular to the side edges, and at least one oblique fiducial line on the substrate sheet of material, extending from one side edge to the other, crossing at least some of the first and second fiducial lines and oriented at an oblique angle relative to the side edges.

11. A roll of material as in claim 10, further including a circle imprinted on the substrate sheet of material, the circle having a diameter equal to the width of the substrate sheet of material, such that the circle falls tangentially on each of said side edges.

12. A roll of material as in claim 10, further including at least one circle imprinted on the sheet of material and intersecting some of the fiducial lines.

13. A roll of material as in claim 10, wherein the second fiducial lines include a beginning second fiducial line which comprises the leading edge of the substrate material.

14. A sheet of manufactured construction material having as manufactured fiducial markings for visual reference of a worker installing the sheet of material in whole or in part, comprising:

a substrate sheet of material of preselected size and having a plurality of edges, a plurality of first fiducial lines parallel to one another, equally spaced and parallel to one edge of the substrate sheet of material, a plurality of second fiducial lines, parallel to one another and equally spaced and perpendicular to said one edge, at least one oblique fiducial line on the substrate sheet of material, crossing at least some of the first and second fiducial lines, and oriented at an oblique angle relative to said one edge, and at least one circle imprinted on the sheet of material and intersecting some of the fiducial lines.

15. A sheet of construction material as in claim 14, wherein said circle has a diameter equal to the width of the substrate sheet of material, such that the circle falls tangentially on said one edge and on an opposite, parallel edge of the sheet of material.

*16. A sheet of manufactured construction material having as manufactured fiducial markings for visual reference of a worker installing the sheet of material in whole or in part, comprising:*

*a rectangular substrate sheet of material of preselected size having a width and a length and having a plurality of edges;*

*a plurality of first fiducial lines parallel to one another and to one edge of the substrate sheet of material; and*

*at least one oblique fiducial line on the substrate sheet of material, crossing at least some of the first fiducial lines, and oriented at an oblique angle relative to said one edge, said oblique fiducial line being easily distinguishable from any other oblique lines on said substrate sheet.*

*17. A sheet of construction material as in claim 16, further including at least one circle imprinted on the sheet of substrate material and intersecting at least some of the fiducial lines.*

*18. A sheet of construction material as in claim 16, further including a plurality of second fiducial lines, parallel to one another, and perpendicular to said first fiducial lines.*

*19. A roll of manufactured material having as manufactured fiducial markings for visual reference of a worker installing the material from the roll, comprising:*

*a substrate sheet of material of preselected width and having a length, a leading edge, and two parallel side edges;*

*a plurality of first fiducial lines parallel to one another and to one edge of the substrate sheet material; and*

*at least one oblique fiducial line on the substrate sheet of material, extending from one side edge to the other, crossing at least some of said first fiducial lines, and oriented at an oblique angle relative to the side edges.*

*20. A roll of manufactured material as in claim 19, further including a circle imprinted on the substrate sheet of material and intersecting some of the first fiducial lines.*

* * * * *